Figure 1:
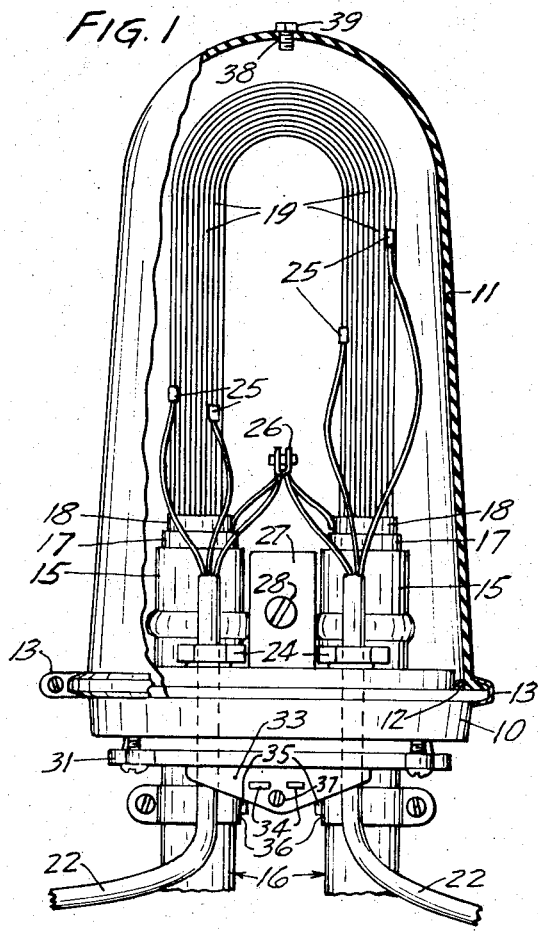

United States Patent

[11] 3,557,299

| [72] | Inventor | Zoltan B. Dienes |
| | | Toronto, Ontario, Canada |
| [21] | Appl. No. | 797,862 |
| [22] | Filed | Feb. 10, 1969 |
| [45] | Patented | Jan. 19, 1971 |
| [73] | Assignee | Minnesota Mining and Manufacturing Company |
| | | St. Paul, Minn. |
| | | a corporation of Delaware |

[54] SEALED CABLE CLOSURE
5 Claims, 5 Drawing Figs.

[52] U.S. Cl. .................................................. 174/38,
29/446; 174/17, 174/60, 174/77; 277/166
[51] Int. Cl. ...................................................... H02g 9/02,
H02g 15/04
[50] Field of Search........................................... 174/17,
19—23, 38, 60, 71, 74, 74.1, 77, 87, 88, 91—93;
285/137(Inquired); 277/1, 166(Inquired);
29/446(Inquired); 339/(Inquired)

[56] References Cited
UNITED STATES PATENTS

| 2,823,248 | 2/1958 | Schaefer........................ | 174/77 |
| 2,953,625 | 9/1960 | Hasselhorn.................... | 174/60 |
| 3,084,961 | 4/1963 | Merriman...................... | 285/137X |
| 3,435,124 | 3/1969 | Channell ....................... | 174/17X |

FOREIGN PATENTS

| 576,084 | 5/1959 | Canada ......................... | 174/77 |
| 724,596 | 2/1955 | Great Britain................. | 174/77 |

*Primary Examiner*—Laramie E. Askin
*Attorney*—Kinney, Alexander, Sell, Steldt & Delahunt

ABSTRACT: A device for making tap connections to continuous cable wherein a loop of the cable, with insulated conductors exposed for connection, is brought through a tightly fitting rubbery sleeve into a connection area which is thereafter hermetically sealed.

PATENTED JAN 19 1971 3,557,299

INVENTOR.
ZOLTAN B. DIENES
BY Kinney, Alexander,
Sell, Steldt & DeLa Hunt
ATTORNEYS

SEALED CABLE CLOSURE

This invention relates to the making of moistureproof connections to electrical cables and to apparatus useful therein. Although not limited thereto, the invention is of particular utility in making service connections to buried communications cables, as in extending telephone services into new housing developments, and for convenience will be described primarily in terms of such usage.

U.S. Pat. Nos. 3,150,221 and 3,187,081 described one form of apparatus and method useful in tapping a buried communications cable, wherein the cable is plugged at both sides of the splice area, thereby necessitating a pneumatic interconnection in order to maintain positive gas pressure within the entire cable.

The present invention does not require plugging of the cable. A constant pressure may be maintained throughout the system, thereby preventing entry of moisture. Service connections are made without cutting of the conductors. The connection area is fully protected and hermetically sealed, yet may easily be reopened and reclosed whenever desired for making other connections or for inspection or other purposes.

Figure 2:
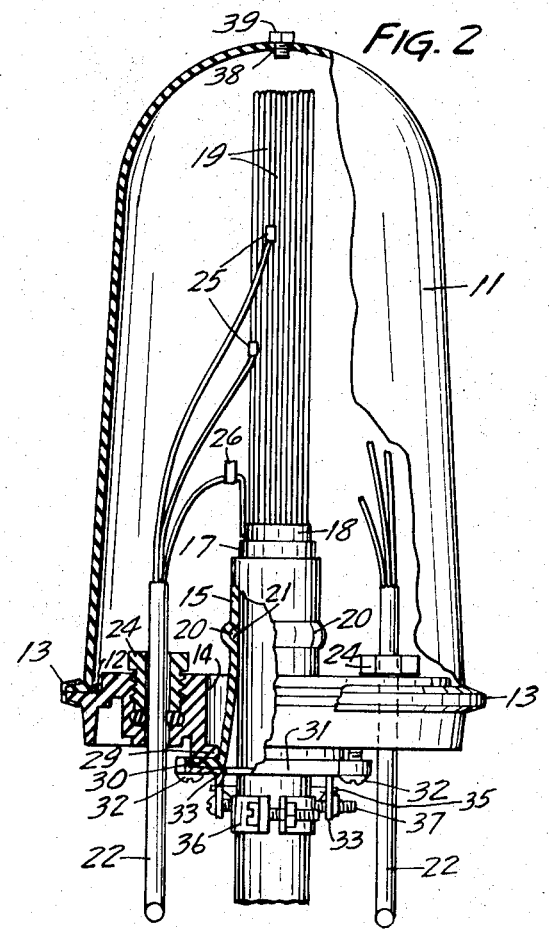
Figure 3:
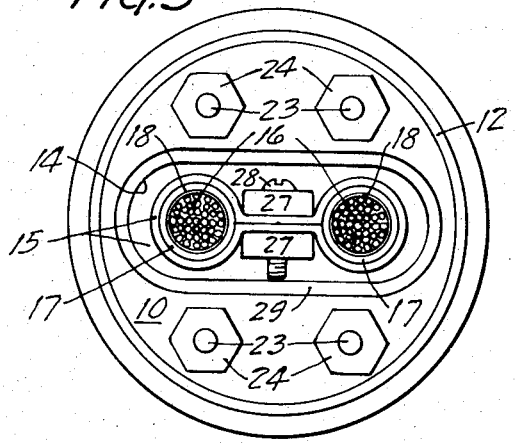
Figure 4:
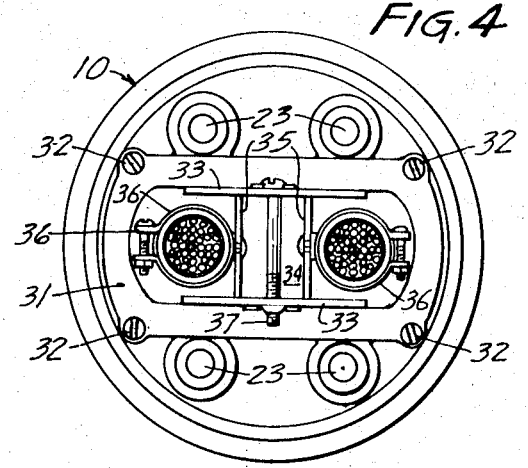
Figure 5:
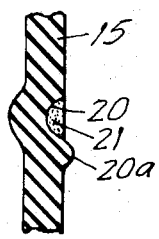

The invention will be further described by reference to the drawing, wherein:

FIG. 1 illustrates a completed cable closure in front elevation, partly cut away, FIG. 2 illustrates the assembly in side elevation partly cut away, FIG. 3 is a partial top plan view, FIG. 4 is a partial bottom plan view, and FIG. 5 is a detail view showing a portion of the sleeve 15 in cross section The closure comprises a molded base 10 surmounted by a protective cap 11 and hermetically sealed thereto by an O-ring 12 and a ring clamp 13. The base 10 is provided with a central oval opening 14 into which is fitted an elastic sleeve 15 into which the looped cable 16 is inserted, the cable thereby abutting against the inner edge walls of the sleeve. The plastic covering 17 and conductive sheath 18 of the cable are removed from around the conductors 19 over the portion forming the cable loop, to permit access to the conductors. It will be appreciated that two cable ends, rather than a loop of continuous cable, may be similarly accommodated.

The wall of the elastic sleeve 15 is outwardly bulged circumferentially to form an inner channel 20 which is filled with an adhesive mastic composition 21. Although not essential, an inner ridge 20a, shown in FIG. 5, is desirably provided adjacent the lip of the channel nearest the outer open end of the sleeve 15, to prevent contact between cable and mastic during insertion of the cable.

Perforations 23 in the base 10 provide entry ports for service connection cables 22 which are sealed in place by pack nuts 24 and appropriate gaskets; or the ports may be suitably plugged when not in use. The ground wires of the service cables 22 are connected to the ground sheath 18 at connections 26, and the lead wires of the cables 22 are connected to appropriate conductors 19 of the cable 16 at connections 25. These connections may be made by twisting and soldering, or with screw clamps or solderless connectors, or in any other desired manner.

The elastic sleeve 15 is drawn tightly around the two parts of the cable 16, forcing the mastic 21 into continuous moisture-resistant adherent contact with the entire periphery of each cable portion, by means of compression plates 27 which are forced against the intervening portions of the sleeve 15 is thereby placed under tension around the cables, and remains resiliently in contact therewith throughout subsequent changes in temperature, to form a permanent hermetic seal. A suitable sleeve is composed of rubbery ethylene-propylene polymer.

The outer flanged edge 30 of the outwardly flaring sleeve 15 is adherently bonded to the outer edge 29 of the rim forming the wall of the opening 14, and is further held in place by the open-centered oval retaining member 31 and screws 32, thus completing the hermetic seal between the cable and the base 10. Triangular flanges 33 depend from the side edges of the central opening of ring 31 and are joined by a spreader 34 having end tabs fitting into slots in the flanges 33 and which is held tightly in place by a screw 37. The opposite side edges of the spreader 34 are themselves formed as dependent triangular flanges 35 on which are supported clamps 36 in line with the positions of the two parallel legs of the cable. The clamps 36 thus support the cable rigidly in position with respect to the base 10 and the sleeve 15.

The cap 11 may be provided with a terminal aperture 38 which may temporarily be sealed with a plug 39 or with a pressure gauge or other appurtenances as desired.

It will be seen from the forgoing description that hermetically sealed connection area is provided which permits flow of dry nitrogen or other protective gases from and into the interior of the cable 16 without requiring any terminal plug thereof. Pneumatic connection within the cable is maintained. The connection area may at any time be readily opened for making or changing connections, for inspection and testing of the cable, or for other purposes, yet the system is completely protected at all other times and under all normal variations in ambient conditions. Protection is maintained under changing temperature and pressure conditions, since the elastic sleeve remains under tension around the cable and continually adjusts to changes in dimensions of the cable and the other components.

I claim:

1. In a cable installation, a cable closure making a hermetically sealed connection with parallel legs of a flexible cable and comprising a base having an oval opening, a rubbery sleeve mounted within said opening with one end sealed to the edge of said base defining said opening, a continuous line of adhesive mastic composition formed circumferentially about teach of said legs within said sleeve, and pressure plates clamping together the sidewalls of said sleeve 2. The closure 1 including means supporting said legs of cable in fixed position adjacent and in line with the ends of said oval opening and the inner edge walls of said sleeve.

3. The closure of claim 2 including access means in said base for permitting connection to said cable therethrough.

4. The closure of claim 3 including cover means protectively hermetically enclosing said cable and connections.

5. The closure of claim 1 wherein said sleeve is constructed with an inner circumferential shallow channel between parallel lips and with an inwardly extending ridge adjacent the lip of said channel nearest the outer open end of said sleeve, and wherein said channel is filled with said adherent mastic composition.

UNITED STATES PATENT OFFICE
CERTIFICATE OF CORRECTION

Patent No. 3,557,299    Dated January 19, 1971

Inventor(s) Zoltan B. Dienes

It is certified that error appears in the above-identified patent and that said Letters Patent are hereby corrected as shown below:

Column 1, line 9, "described" should be -- describe -- .

Column 2, line 3, after "sleeve" insert -- by a screw 28 passing through holes provided in the side walls of the sleeve, as shown in Figures 1 and 3. The rubbery sleeve 15 -- .

Claim 1, line 7, "teach" should read -- each -- .

Claim 2, line 1, after "closure" insert -- of claim -- .

Signed and sealed this 11th day of May 1971.

(SEAL)
Attest:

EDWARD M. FLETCHER, JR.
Attesting Officer

WILLIAM E. SCHUYLER, JR
Commissioner of Patents